(12) United States Patent
Kawasaki

(10) Patent No.: US 7,602,556 B2
(45) Date of Patent: Oct. 13, 2009

(54) MICROSCOPE USING OIL IMMERSION SYSTEM OBJECTIVE AND ITS MICROSCOPY

(75) Inventor: Kenji Kawasaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 172 days.

(21) Appl. No.: 11/454,909

(22) Filed: Jun. 19, 2006

(65) Prior Publication Data

US 2006/0285203 A1 Dec. 21, 2006

(30) Foreign Application Priority Data

Jun. 20, 2005 (JP) .............................. 2005-178995

(51) Int. Cl.
*G02B 21/02* (2006.01)
(52) U.S. Cl. ..................... 359/660; 359/368; 359/656
(58) Field of Classification Search ......... 359/368–390, 359/656–661
See application file for complete search history.

(56) References Cited

U.S. PATENT DOCUMENTS 6,560,032 B2 * 5/2003 Hatano ....................... 359/656
7,085,045 B2 * 8/2006 Hanzawa et al. ............ 359/376
2004/0257962 A1 * 12/2004 Walker et al. ........... 369/112.23
2006/0109558 A1 * 5/2006 Nishioka ..................... 359/642

FOREIGN PATENT DOCUMENTS

| JP | 11-269317 | 10/1999 |
|---|---|---|
| JP | 2002-350734 | 12/2002 |

* cited by examiner

*Primary Examiner*—Thong Nguyen
(74) *Attorney, Agent, or Firm*—Kenyon & Kenyon LLP

(57) ABSTRACT

A microscope has an oil immersion system objective and an imaging lens to make observations by charging oil between a cover glass protecting a sample and the most sample-side lens surface. At least one of a plurality of lens units, placed on the image side of the most sample-side lens in the oil immersion system objective, is moved along the optical axis, and thereby a front focal distance and a front focal position can be adjusted so that a predetermined depth position of the sample is focused in a state where a working distance WD between the cover glass and the most sample-side lens surface in the oil immersion system objective is set to a condition, $0 < WD \leq 0.03$ mm.

2 Claims, 4 Drawing Sheets

WD=0.1

0<WD≦0.03

WD=0.1

0<WD≦0.03

WD=0.1

$0 < WD \leq 0.03$

MICROSCOPE USING OIL IMMERSION SYSTEM OBJECTIVE AND ITS MICROSCOPY

This application claims benefits of Japanese Application No. 2005-178995 filed in Japan on Jun. 20, 2005, the contents of which are hereby incorporated by reference.

BACKGROUND OF THE INVENTION

1. Field of the Invention

This invention relates to a microscope using an oil immersion system objective for observing fluorescent light emanating from a sample, such as a living cell, and an observation method of this microscope.

2. Description of Related Art

In the most advanced research field at present, various methods of observing cells, in vivo, for a long period of time (several days to several weeks) are developed for purposes of the functional clarification of living cells and the behavior analysis and interaction clarification of a protein. As one technique of microscopy for observing a lesion part inside a living cell, a fluorescence observation has been generally carried out. The fluorescence observation is such that, after a particular fluorescent substance like a fluorescent protein is used as a light-emitting label to stain a living sample such as the living cell, fluorescent light is produced by irradiating the sample with exciting light and is observed to thereby detect the existence of a particular part in the living sample, such as the lesion part inside the living cell, and its position.

In an observation under a fluorescence microscope, there is a particular demand that an S/N ratio should be good. In order to detect faint fluorescent light, it is necessary to use an oil immersion system objective in which high-resolution and bright fluorescent light is obtained.

The fluorescence microscope using a conventional oil immersion system objective is set forth, for example, in Japanese Patent Kokai No. 2002-350734. Immersion oil for fluorescence microscopes is described, for example, in Japanese Patent Kokai No. Hei 11-269317.

In the fluorescence microscope using the oil immersion system objective, however, as described in Kokai No. Hei 11-269317, auto-fluorescence emanating from immersion oil charged between a sample (strictly speaking, a cover glass covering the sample) and the oil immersion system objective adversely affects the S/N ratio. Thus, in order to obtain a high S/N ratio, it is desired to minimize a distance between the sample and the oil immersion system objective.

SUMMARY OF THE INVENTION

The microscope using an oil immersion system objective according to the present invention comprises an oil immersion system objective and an imaging lens, and observation is made upon oil being charged between a cover glass protecting a sample and a most sample-side lens surface of the objective. The oil immersion system objective is constructed and arranged to have an adjustable front focal length and an adjustable front focal position so that a predetermined depth position in the sample is focused on in a state where the working distance WD between the cover glass and the most sample-side lens surface is set to satisfy the condition, $0<WD<0.03$ mm.

In the microscope according to the present invention, the oil immersion system objective has movable lens groups to provide an adjustable working distance, an adjustable front focal length, and an adjustable front focal position.

Alternatively, according to the present invention, an adjustable front focal length and an adjustable front focal position of the oil immersion system objective are achieved by an optical member, which is different from the oil immersion system objective, placed in the optical path.

Also, in the observation method of a microscope using an oil immersion system objective according to the present invention, oil is charged between the cover glass protecting the sample and the most sample-side lens surface of the oil immersion system objective, the working distance WD is set to satisfy the condition $0<WD<0.03$ mm, and the front focal length and the front focal position of the oil immersion system objective are adjusted so that a predetermined depth position in the sample is focused on in the state where the working distance WD is set to satisfy the condition $0<WD<0.03$.

In the observation method of a microscope using an oil immersion system objective according to the present invention, the front focal length and the front focal position of the oil immersion system objective are adjusted by moving lens groups included in the oil immersion system objective.

Alternatively, the front focal length and the front focal position of the oil immersion system objective are adjusted by placing an optical member different from the oil immersion system objective in the optical path.

According to the present invention, in a state where the distance between the sample (strictly speaking, the cover glass covering the sample) and the oil immersion system objective approaches zero as far as possible, the focal length can be adjusted to observe the sample. Consequently, the production of auto-fluorescence from the immersion oil charged between the sample and the oil immersion system objective can be minimized, and the microscope using the oil immersion system objective in which the S/N ratio of a fluorescent image is high and the observation method of this microscope are obtained.

These and other features and advantages of the present invention will become apparent from the following detailed description of the preferred embodiments when taken in conjunction with the accompanying drawings.

DETAILED DESCRIPTION OF THE PREFERRED EMBODIMENTS

Figure 1A:
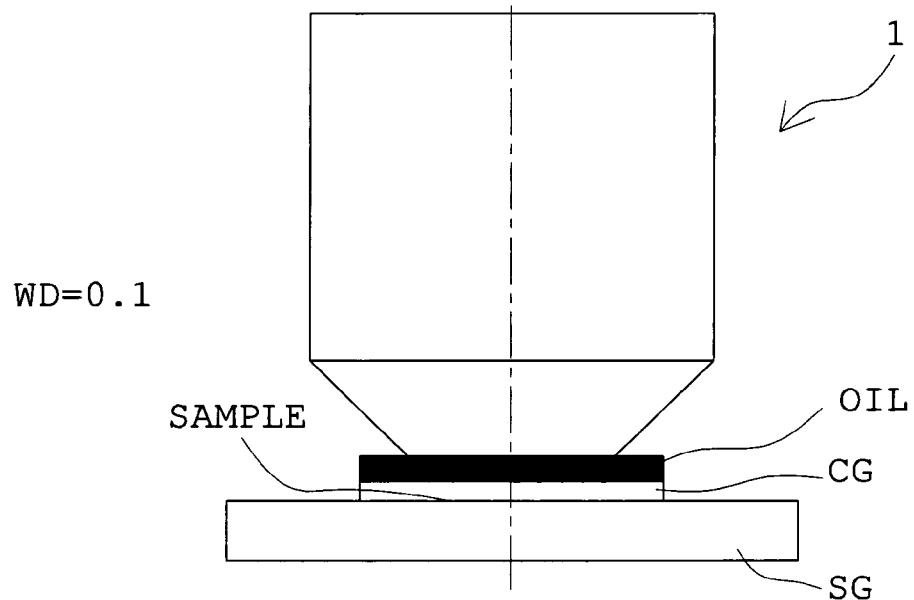
FIGS. 1A and 1B are explanatory views showing positional relationships between the oil immersion system objective and the sample, used in the microscope of a first embodiment according to the present invention, where the working distance WD between the cover glass covering the sample and the oil immersion system objective is set to 0.1 mm and the working distance WD between the cover glass covering the sample and the oil immersion system objective is set to the condition, $0<WD\leqq0.03$ mm, respectively.

Before undertaking the description of specific embodiments, a supplementary explanation will be made on the function and effect of the present invention.

In the oil immersion system objective used in the conventional microscope of this type, the ratio of the amount of auto-fluorescence emanating from the immersion oil to that emanating from the entire oil immersion system objective is approximately 30%.

As in the microscope using the oil immersion system objective of the present invention, when the distance between the sample and the oil immersion system objective approaches zero as far as possible, the thickness of the immersion oil also approaches zero. According to the microscope using the oil immersion system objective of the present invention, therefore, the total amount of auto-fluorescence can be reduced by as large as about 30%, compared with the conventional microscope of this type, and the fluorescent image of a high S/N ratio is obtained.

In a way of changing the working distance between the sample and the oil immersion system objective, like the conventional microscope, a collision of the oil immersion system objective against the sample and damage to the sample are liable to occur when the working distance between the sample and the oil immersion objective is shortened. In addition, for example, a part of considerable depth in the sample of some thickness cannot be focused, and thus the adjustment of the focal length is limited. Consequently, in the conventional microscope of this type, it is necessary that the working distance between the sample and the oil immersion system objective, or in other words, a space in which the immersion oil is charged, is at least about 0.1 mm. In this structure, however, the auto-fluorescence from the immersion oil cannot be made to vanish.

In contrast to this, like the microscope using the oil immersion system objective of the present invention, when the sample and the oil immersion system objective are fixed in a state where the distance between them approaches zero as far as possible so that the focal length is adjusted by a partial lens located on the image side of the most sample-side lens, the auto-fluorescence from the immersion oil is made to vanish and the fluorescent image of the high S/N ratio can be obtained. Moreover, it can be prevented that the oil immersion system objective collides against the sample to damage the sample, and a part of considerable depth in the sample can be focused. In this way, its operation property is much improved, as compared with the conventional microscope of this type.

The microscope using the oil immersion system objective according to the present invention comprises an oil immersion system objective and an imaging lens, and observations are made by charging oil between a cover glass protecting a sample and the most sample-side lens surface. In this case, a front focal position and a front focal distance can be adjusted so that a predetermined depth position of the sample is focused in a state where a working distance WD between the cover glass and the most sample-side lens surface in the oil immersion system objective is set to a condition, $0<WD\leqq0.03$ mm.

In the microscope using the oil immersion system objective of the present invention, it is desirable that at least a partial lens placed on the image side of the most sample-side lens of lenses constituting the oil immersion system objective is moved along the optical axis, and thereby the front focal position and the front focal distance can be adjusted so that a predetermined depth position of the sample is focused in a state where the working distance WD between the cover glass and the most sample-side lens surface in the oil immersion system objective is set to the condition, $0<WD\leqq0.03$ mm.

In the microscope using the oil immersion system objective of the present invention, it is desirable that an optical member different from the oil immersion system objective is placed on the optical path, and thereby the front focal position and the front focal distance can be adjusted so that a predetermined depth position of the sample is focused in a state where the working distance WD between the cover glass and the most sample-side lens surface in the oil immersion system objective is set to the condition, $0<WD\leqq0.03$ mm.

In the microscope using the oil immersion system objective of the present invention, it is desirable that at least a partial lens placed on the image side of the most sample-side lens of lenses constituting the oil immersion system objective is moved along the optical axis, and thereby the front focal position and the front focal distance can be adjusted so that the same depth position on the sample is focused while keeping an imaging position at an image plane constant in a state where the working distance WD between the cover glass and the most sample-side lens surface in the oil immersion system objective is set to the condition, $0<WD\leqq0.03$ mm in accordance with the thickness of the cover glass.

In the microscope using the oil immersion system objective of the present invention, it is desirable that an optical member different from the oil immersion system objective is placed on the optical path, and thereby the front focal position and the front focal distance can be adjusted so that the same depth position on the sample is focused while keeping an imaging position at an image plane constant in a state where the working distance WD between the cover glass and the most sample-side lens surface in the oil immersion system objective is set to the condition, $0<WD\leqq0.03$ mm in accordance with the thickness of the cover glass.

In the microscope using the oil immersion system objective of the present invention, it is desirable that at least a partial lens placed on the image side of the most sample-side lens of lenses constituting the oil immersion system objective is moved along the optical axis, and thereby the front focal position and the front focal distance can be adjusted so that a desired depth position in the sample is focused while keeping an imaging position at an image plane constant in a state where the working distance WD between the cover glass and the most sample-side lens surface in the oil immersion system objective is set to the condition, $0<WD\leqq0.03$ mm.

In the microscope using the oil immersion system objective of the present invention, it is desirable that an optical member different from the oil immersion system objective is placed on the optical path, and thereby the front focal position and the front focal distance can be adjusted so that a desired depth position in the sample is focused while keeping an imaging position at an image plane constant in a state where the working distance WD between the cover glass and the most sample-side lens surface in the oil immersion system objective is set to the condition, $0<WD\leqq0.03$ mm.

In the microscope using the oil immersion system objective of the present invention, it is desirable that the oil immersion system objective comprises, in order from the sample side, a first lens unit, the most image-side surface of which is convex, having positive refracting power as a whole; a second lens unit, the most image-side surface of which is convex, having positive refracting power as a whole; a third lens unit constructed with a cemented lens, having positive refracting power as a whole; and a fourth lens unit constructed with a cemented lens, having negative refracting power as a whole, and when the working distance WD between the cover glass and the most sample-side lens surface in the oil immersion system objective is changed from $0.03$ mm$<WD$ to $0<WD\leqq0.03$ mm, a spacing between the first lens unit and the second lens unit is widened, a spacing between the second lens unit and the third lens unit is narrowed, and a spacing between third lens unit and the fourth lens unit is narrowed, and thereby the front focal position and the front focal distance are adjusted so that a predetermined depth position of the sample is focused.

In the microscope using the oil immersion system objective of the present invention, it is desirable that a corrected lens is interposed between the oil immersion system objective and the imaging lens to thereby provide a function exercised so that the front focal position and the front focal distance where the working distance WD between the cover glass and the most sample-side lens surface in the oil immersion system objective is set to the condition, $0<WD\leqq0.03$ mm, have values identical with the front focal position and the front focal distance where the corrected lens fails to lie between the oil immersion system objective and the imaging lens and where the working distance WD between the cover glass and the most sample-side lens surface in the oil immersion system objective is set to a condition, $0.03$ mm$<WD$.

In the microscope using the oil immersion system objective of the present invention, it is desirable that the corrected lens comprises, in order from the oil immersion system objective side, a first corrected lens unit with positive refracting power, a second corrected lens unit with negative refracting power, and a third corrected lens unit with positive refracting power, and is movable in and out of the optical path between the oil immersion system objective and the imaging lens, and when the corrected lens is introduced between the oil immersion system objective and the imaging lens and thereby the working distance WD between the cover glass and the most sample-side lens surface in the oil immersion system objective is set to the condition, $0<WD\leqq0.03$ mm, each of the first corrected lens unit and the second corrected lens unit provides a function exercised so as to have values identical with the front focal position and the front focal distance where the oil immersion system objective and the imaging lens are included and where the working distance WD between the cover glass and the most sample-side lens surface in the oil immersion system objective is set to the condition, $0.03$ mm$<WD$, and the third corrected lens unit provides a function of keeping the imaging position at the image plane constant.

In the microscope using the oil immersion system objective of the present invention, it is desirable that the corrected lens comprises, in order from the oil immersion system objective side, the first corrected lens unit with positive refracting power, the second corrected lens unit with negative refracting power, and the third corrected lens unit with positive refracting power, and is provided between the oil immersion system objective and the imaging lens, and when the working distance WD between the cover glass and the most sample-side lens surface in the oil immersion system objective is set to the condition, $0<WD\leqq0.03$ mm, each of the first corrected lens unit and the second corrected lens unit provides a function exercised so as to have values identical with the front focal position and the front focal distance where the oil immersion system objective and the imaging lens are included and where the working distance WD between the cover glass and the most sample-side lens surface in the oil immersion system objective is set to the condition, $0.03$ mm$<WD$, and the third corrected lens unit provides a function of keeping the imaging position at the image plane constant, and when the front focal position of the oil immersion system objective coincides with the surface of the sample, a magnification becomes 1× so that when the working distance WD between the cover glass and the most sample-side lens surface in the oil immersion system objective is changed from $0.03<WD$ to $0<WD\leqq0.03$ mm, a spacing between the oil immersion system objective and the first corrected lens unit is narrowed, a spacing between the first corrected lens unit and the second corrected lens unit is widened, and a spacing between the second corrected lens unit and the third corrected lens unit is narrowed.

In the observation method of the microscope using the oil immersion system objective of the present invention, the microscope comprises an oil immersion system objective and an imaging lens, and observations are made by charging oil between a cover glass protecting a sample and the most sample-side lens surface. In this case, a working distance WD between the cover glass and the most sample-side lens surface in the oil immersion system objective is set to a condition, $0<WD\leqq0.03$ mm, and in this state, the front focal position and the front focal distance of the oil immersion system objective are adjusted so that a predetermined depth position of the sample is focused.

In the observation method of the microscope using the oil immersion system objective of the present invention, it is desirable that at least a partial lens placed on the image side of the most sample-side lens of lenses constituting the oil immersion system objective is moved along the optical axis, and thereby the front focal position and the front focal distance are adjusted so that a predetermined depth position of the sample is focused in a state where the working distance WD between the cover glass and the most sample-side lens surface in the oil immersion system objective is set to the condition, $0<WD\leqq0.03$ mm.

In the observation method of the microscope using the oil immersion system objective of the present invention, it is desirable that an optical member different from the oil immersion system objective is placed on the optical path, and thereby the front focal position and the front focal distance are adjusted so that a predetermined depth position of the sample is focused in a state where the working distance WD between the cover glass and the most sample-side lens surface in the oil immersion system objective is set to the condition, $0<WD\leqq0.03$ mm.

In the observation method of the microscope using the oil immersion system objective of the present invention, it is desirable that at least a partial lens placed on the image side of the most sample-side lens of lenses constituting the oil immersion system objective is moved along the optical axis, and thereby the front focal position and the front focal distance are adjusted so that a predetermined depth position of the sample is focused while keeping an imaging position at an image plane constant in a state where the working distance WD between the cover glass and the most sample-side lens surface in the oil immersion system objective is set to the condition, $0<WD\leqq0.03$ mm in accordance with the thickness of the cover glass.

In the observation method of the microscope using the oil immersion system objective of the present invention, it is desirable that an optical member different from the oil immersion system objective is placed on the optical path, and thereby the front focal position and the front focal distance are adjusted so that the same depth position on the sample is focused while keeping an imaging position at an image plane constant in a state where the working distance WD between the cover glass and the most sample-side lens surface in the oil immersion system objective is set to the condition, $0<WD\leqq0.03$ mm in accordance with the thickness of the cover glass.

In the observation method of the microscope using the oil immersion system objective of the present invention, it is desirable that at least a partial lens placed on the image side of the most sample-side lens of lenses constituting the oil immersion system objective is moved along the optical axis, and thereby the front focal position and the front focal distance are adjusted so that a desired depth position in the sample is focused while keeping an imaging position at an image plane constant in a state where the working distance WD between the cover glass and the most sample-side lens surface in the oil immersion system objective is set to the condition, $0<WD\leqq0.03$ mm.

In the observation method of the microscope using the oil immersion system objective of the present invention, it is desirable that an optical member different from the oil immersion system objective is placed on the optical path, and thereby the front focal position and the front focal distance are adjusted so that a desired depth position in the sample is focused while keeping an imaging position at an image plane constant in a state where the working distance WD between the cover glass and the most sample-side lens surface in the oil immersion system objective is set to the condition, $0<WD\leqq0.03$ mm.

In the observation method of the microscope using the oil immersion system objective of the present invention, it is desirable that the oil immersion system objective comprises, in order from the sample side, a first lens unit, the most image-side surface of which is convex, having positive refracting power as a whole; a second lens unit, the most image-side surface of which is convex, having positive refracting power as a whole; a third lens unit constructed with a cemented lens, having positive refracting power as a whole; and a fourth lens unit constructed with a cemented lens, having negative refracting power as a whole, and when the working distance WD between the cover glass and the most sample-side lens surface in the oil immersion system objective is changed from $0.03$ mm$<WD$ to $0<WD\leqq0.03$ mm, a spacing between the first lens unit and the second lens unit is widened, a spacing between the second lens unit and the third lens unit is narrowed, and a spacing between third lens unit and the fourth lens unit is narrowed, and thereby the front focal position and the front focal distance are adjusted so that a predetermined depth position of the sample is focused.

In the observation method of the microscope using the oil immersion system objective of the present invention, it is desirable that a corrected lens is interposed between the oil immersion system objective and the imaging lens, having a function exercised so that the front focal position and the front focal distance where the corrected lens is interposed between the oil immersion system objective and the imaging lens and where the working distance WD between the cover glass and the most sample-side lens surface in the oil immersion system objective is set to the condition, $0<WD\leqq0.03$ mm, have values identical with the front focal position and the front focal distance where the corrected lens fails to lie between the oil immersion system objective and the imaging lens and where the working distance WD between the cover glass and the most sample-side lens surface in the oil immersion system objective is set to a condition, $0.03$ mm$<WD$.

In the observation method of the microscope using the oil immersion system objective of the present invention, it is desirable that the corrected lens comprises, in order from the oil immersion system objective side, a first corrected lens unit with positive refracting power, a second corrected lens unit with negative refracting power, and a third corrected lens unit with positive refracting power, and is movable in and out of the optical path between the oil immersion system objective and the imaging lens, and when the corrected lens is introduced between the oil immersion system objective and the imaging lens, the working distance WD between the cover glass and the most sample-side lens surface in the oil immersion system objective is set to the condition, $0<WD\leqq0.03$ mm, so as to have values identical with the front focal position and the front focal distance where the oil immersion system objective and the imaging lens are included and where the working distance WD between the cover glass and the most sample-side lens surface in the oil immersion system objective is set to the condition, $0.03$ mm$<WD$, through the first corrected lens unit and the second corrected lens unit, and to keep the imaging position at the image plane constant through the third corrected lens unit.

In the observation method of the microscope using the oil immersion system objective of the present invention, it is desirable that the corrected lens comprises, in order from the oil immersion system objective side, the first corrected lens unit with positive refracting power, the second corrected lens unit with negative refracting power, and the third corrected lens unit with positive refracting power, and is interposed between the oil immersion system objective and the imaging lens, and the working distance WD between the cover glass and the most sample-side lens surface in the oil immersion system objective is set to the condition, $0<WD\leqq0.03$ mm, so as to have values identical with the front focal position and the front focal distance where the oil immersion system objective and the imaging lens are included and where the working distance WD between the cover glass and the most sample-side lens surface in the oil immersion system objective is set to the condition, $0.03$ mm$<WD$, through the first corrected lens unit and the second corrected lens unit, and to keep the imaging position at the image plane constant through the third corrected lens unit, and when the front focal position of the oil immersion system objective coincides with the surface of the sample, a magnification becomes $1\times$ so that when the working distance WD between the cover glass and the most sample-side lens surface in the oil immersion system objective is changed from $0.03<WD$ to $0<WD\leqq0.03$ mm, a spacing between the oil immersion system objective and the first corrected lens unit is narrowed, a spacing between the first corrected lens unit and the second corrected lens unit is widened, and a spacing between the second corrected lens unit and the third corrected lens unit is narrowed.

First Embodiment

Figure 1B:
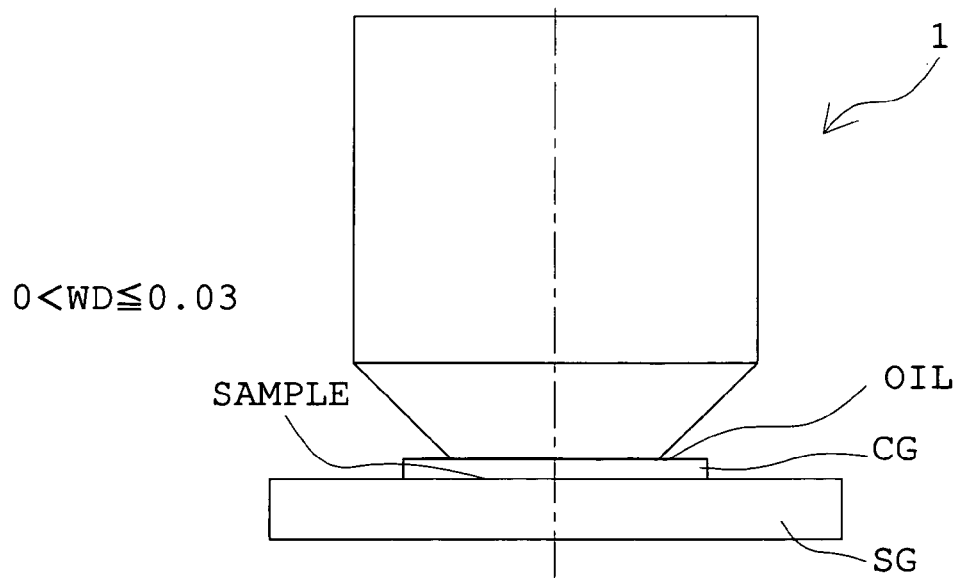
Figure 2A:
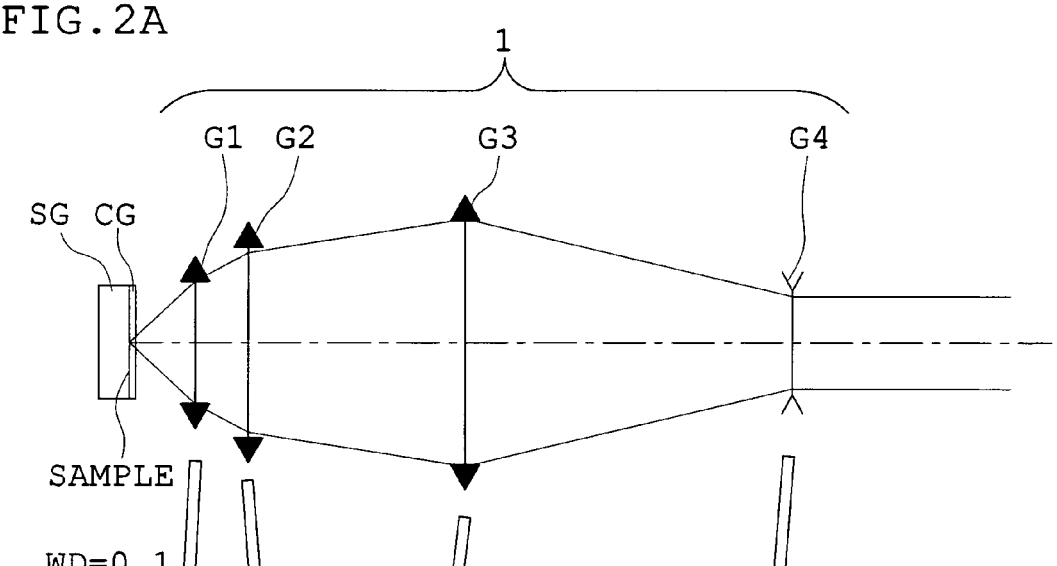
FIGS. 2A and 2B are schematic views of lens units constituting the oil immersion system objectives of FIGS. 1A and 1B, showing the positional relationships of individual lens units in focusing states where the working distance WD between the cover glass covering the sample and the oil immersion system objective is set to 0.1 mm and the working distance WD between the cover glass covering the sample and the oil immersion system objective is set to the condition, $0<WD\leqq0.03$ mm, respectively.
Figure 2B:
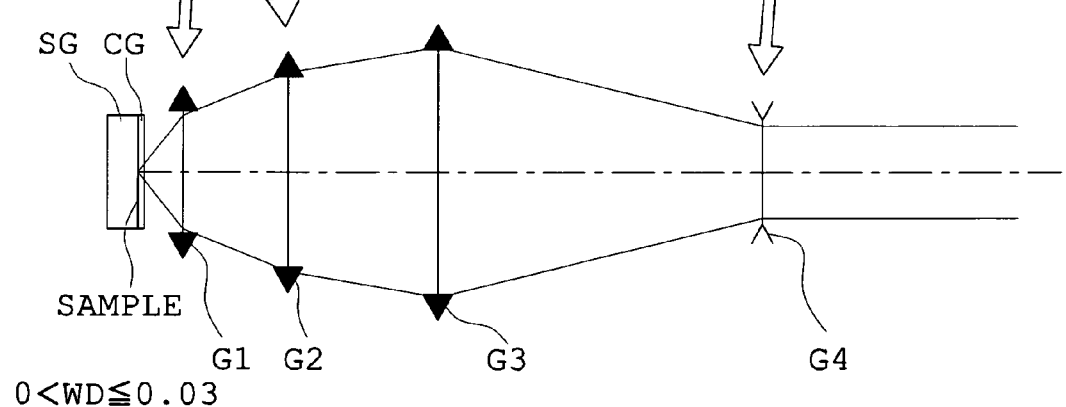

FIGS. 1A and 1B are explanatory views showing positional relationships between the oil immersion system objective and the sample, used in the microscope of the first embodiment according to the present invention, where the working distance WD between the cover glass covering the sample and the oil immersion system objective is set to 0.1 mm and the working distance WD between the cover glass covering the sample and the oil immersion system objective is set to the condition, 0<WD≦0.03 mm, respectively. FIGS. 2A and 2B are schematic views of lens units constituting the oil immersion system objectives of FIGS. 1A and 1B, showing the positional relationships of individual lens units in focusing states where the working distance WD between the cover glass covering the sample and the oil immersion system objective is set to 0.1 mm and the working distance WD between the cover glass covering the sample and the oil immersion system objective is set to the condition, 0<WD≦0.03 mm, respectively. Also, in these figures, reference symbol CG denotes a cover glass and SG denotes a slide glass.

The microscope of the first embodiment comprises, in order from the sample side, an oil immersion system objective 1 and an imaging lens omitted from the figures. The oil immersion system objective includes, in order form the sample side, a first lens unit G1, a second lens unit G2, a third lens unit G3, and a fourth lens unit G4.

The first lens unit G1, the most image-side surface of which is convex, has positive refracting power as a whole. The second lens unit G2, the most image-side surface of which is convex, has positive refracting power as a whole. The third lens unit G3 is constructed with a cemented lens and has positive refracting power as a whole. The fourth lens unit G4 is constructed with a cemented lens and has negative refracting power as a whole.

The individual lens units G1, G2, G3, and G4 constituting the oil immersion system objective 1 are constructed to perform focusing at a predetermined depth position in the sample, having the positional relationship shown in FIG. 2A when the working distance WD between the cover glass CG and the most sample-side lens surface in the oil immersion system objective 1 is 0.1 mm. When the working distance WD between the cover glass CG and the most sample-side lens surface in the oil immersion system objective 1 is changed to 0<WD≦0.03 mm, as shown in FIG. 2B, a spacing between the first lens unit G1 and the second lens unit G2 is widened, a spacing between the second lens unit G2 and the third lens unit G3 is narrowed, and a spacing between the third lens unit G3 and the fourth lens unit G4 is narrowed. Whereby, the oil immersion system objective 1 is constructed so that focusing is performed at a predetermined depth position in the sample as in FIG. 2A and the imaging position at the image plane can be kept constant as in FIG. 2A. Also, the spacing between the first lens unit G1 and the second lens unit G2 is widened and thereby spherical aberration considerably produced in the first lens unit G1 can be reduced.

In the oil immersion system objective 1, when the thickness of the cover glass CG used for observations is changed, at least a part of the lens units G2, G3, and G4 is moved along the optical axis in a predetermined direction by a predetermined amount, with a state where the working distance WD between the cover glass CG and the most sample-side lens surface in the oil immersion system objective 1 becomes 0<WD≦0.03 mm in accordance with the thickness of the cover glass CG. Whereby, focusing is performed at a predetermined depth position in the sample as in FIG. 2A and the imaging position at the image plane can be kept constant as in FIG. 2A.

Furthermore, the oil immersion system objective 1 is constructed so that at least a part of the lens units G2, G3, and G4 is moved along the optical axis in a predetermined direction by a predetermined amount, with a state where the working distance WD between the cover glass CG and the most sample-side lens surface in the oil immersion system objective 1 becomes 0<WD≦0.03 mm, and thereby a desired depth position in the sample is focused and the imaging position at the image plane can be kept constant as in FIG. 2A.

Reference is made to the case where the microscope of the first embodiment constructed as mentioned above is used to carry out observations while suppressing the auto-fluorescence of the sample. Also, the microscope of the first embodiment, as shown in FIG. 2A, is constructed so that even when the working distance WD between the cover glass CG and the most sample-side lens surface in the oil immersion system objective 1 is 0.1 mm, the sample can be observed if of the amount of auto-fluorescence is not taken into account.

The working distance WD between the cover glass CG and the most sample-side lens surface in the oil immersion system objective 1 is brought into a state of nearly zero (0<WD≦0.03 mm). In this case, the spacing between the first lens unit G1 and the second lens unit G2 is widened, the spacing between the second lens unit G2 and the third lens unit G3 is narrowed, and the spacing between the third lens unit G3 and the fourth lens unit G4 is narrowed (see FIG. 2B). Whereby, focusing is performed at a predetermined depth position in the sample as in FIG. 2A and at the same time, the imaging position at the image plane is kept as in FIG. 2A. When the spacing between the first lens unit G1 and the second lens unit G2 is widened, spherical aberration considerably produced in the first lens unit G1 is reduced.

Also, even when the cover glass CG to be used has a different thickness, the working distance WD between the cover glass CG and the most sample-side lens surface in the oil immersion system objective 1 is brought into a state of nearly zero (0<WD≦0.03 mm) in accordance with the thickness of the cover glass CG. Each of the lens units G2, G3, and G4 is moved along the optical axis in a predetermined direction by adjusting its amount of movement. Whereby, focusing is performed at a predetermined depth position in the sample as in FIG. 2A and at the same time, the imaging position at the image plane is kept as in FIG. 2A.

Subsequently, the working distance WD between the cover glass CG and the most sample-side lens surface in the oil immersion system objective 1 is brought into a state of nearly zero (0<WD≦0.03 mm). Each of the lens units G2, G3, and G4 is moved along the optical axis in a predetermined direction by adjusting its amount of movement. Whereby, focusing is performed at a desired depth position in the sample and at the same time, the imaging position at the image plane is kept as in FIG. 2A.

According to the microscope of the first embodiment, as mentioned above, the working distance WD between the cover glass CG and the most sample-side lens surface in the oil immersion system objective 1 is brought into a state of nearly zero (0<WD≦0.03 mm), and a predetermined depth position of the sample can be observed. Consequently, the thickness of the immersion oil becomes nearly zero and the auto-fluorescence from the immersion oil can be made to practically vanish.

As described above, when the working distance WD between the cover glass CG and the most sample-side lens surface in the oil immersion system objective 1 is about 0.1 mm, the amount of auto-fluorescence emanating from the immersion oil charged in this space makes up about 30% of the amount of auto-fluorescence emanating from the entire oil immersion system objective. According to the microscope of the first embodiment, therefore, the working distance WD between the cover glass CG and the most sample-side lens surface in the oil immersion system objective 1 is brought into a state of nearly zero (0<WD≦0.03 mm) and thereby the auto-fluorescence can be reduced by about 30%.

Further, according to the microscope of the first embodiment, even when the thickness of the cover glass CG is changed, the working distance WD between the cover glass CG and the most sample-side lens surface in the oil immersion system objective 1 is brought into a state of nearly zero (0<WD≦0.03 mm) and the same depth position of the sample cam be observed. Thus, according to the microscope of the first embodiment, the working distance WD between the cover glass CG and the most sample-side lens surface in the oil immersion system objective 1 is brought into a state of nearly zero, and a favorable image can be observed without undergoing the influence of the error of the thickness of the cover glass CG.

Still further, according to the microscope of the first embodiment, with a state where the working distance WD between the cover glass CG and the most sample-side lens surface in the oil immersion system objective 1 is set to nearly zero (0<WD≦0.03 mm), a desired depth position of the sample can be observed. Thus, according to the microscope of the first embodiment, when an observation object area is found, the working distance WD between the cover glass CG and the most sample-side lens surface in the oil immersion system objective 1 is increased (here, 0.1 mm) and observed, and in the fluorescence observation, auto-fluorescence from the immersion oil is made to vanish and the fluorescent image of the high S/N ratio can be obtained. In addition, it can be prevented that the oil immersion system objective 1 collides against the sample to damage the sample, and a part of considerable depth in the sample can be focused. In this way, its operation property is much improved, as compared with the conventional microscope of this type.

Second Embodiment

Figure 3A:
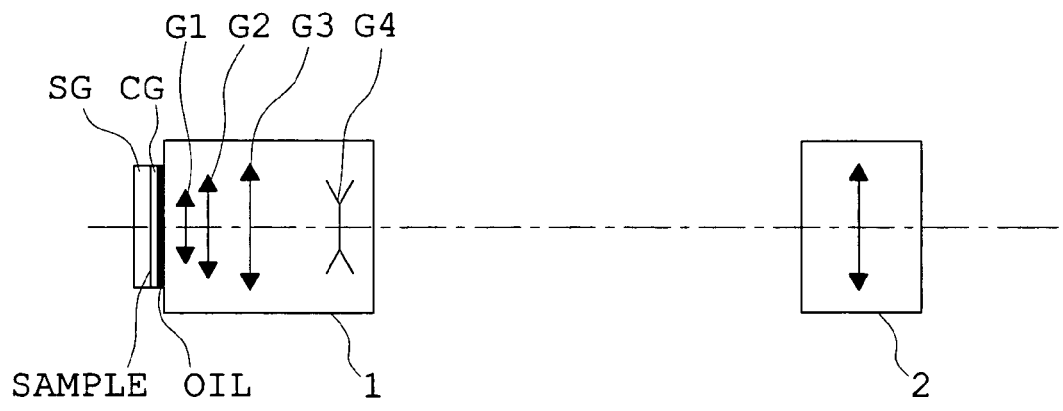
FIGS. 3A and 3B are schematic views showing optical arrangements in the microscope of a second embodiment according to the present invention in focusing states where the working distance WD between the cover glass covering the sample and the oil immersion system objective is set to 0.1 mm and the working distance WD between the cover glass covering the sample and the oil immersion system objective is set to the condition, $0<WD\leqq0.03$ mm, respectively.
Figure 3B:
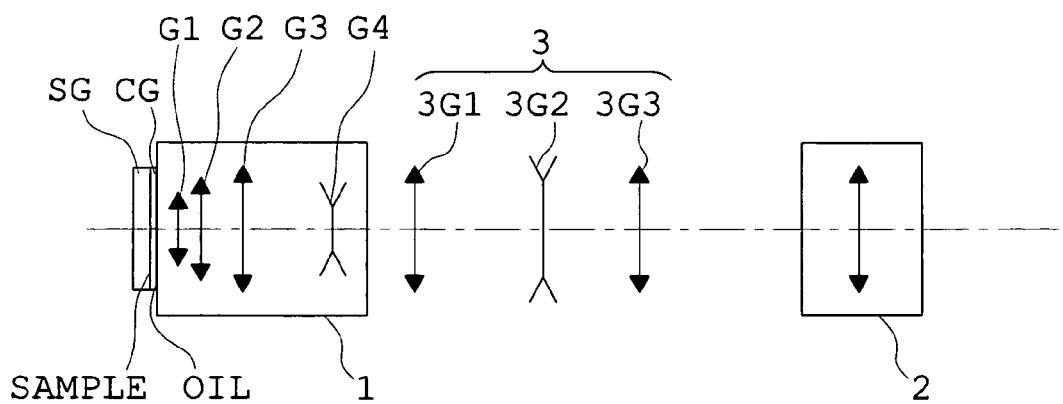

FIGS. 3A and 3B are schematic views showing optical arrangements in the microscope of the second embodiment according to the present invention in focusing states where the working distance WD between the cover glass covering the sample and the oil immersion system objective is set to 0.1 mm and the working distance WD between the cover glass covering the sample and the oil immersion system objective is set to the condition, 0<WD≦0.03 mm, respectively. Also, in these figures, reference symbol CG denotes the cover glass and SG denotes the slide glass.

The microscope of the second embodiment comprises, in order from the sample side, the oil immersion system objective 1, an imaging lens 2, and a corrected lens 3 provided to be movable in and out of the optical path between the oil immersion system objective 1 and the imaging lens 2. The corrected lens 3 includes, in order from the oil immersion system objective 1 side, a first corrected lens unit 3G1 with positive refracting power, a second corrected lens unit 3G2 with negative refracting power, and a third corrected lens unit 3G3 with positive refracting power.

As shown in FIG. 3A, in a focusing state where the working distance WD between the cover glass CG covering the sample and the oil immersion system objective 1 is 0.1 mm, the corrected lens 3 is removed from the optical path, and as shown in FIG. 3B, the positional relationship of the lens units G1, G2, G3, and G4 constituting the oil immersion system objective 1 in FIG. 3A is not adjusted. When the whole of the oil immersion system objective 1 approaches the sample and the working distance WD between the cover glass CG covering the sample and the oil immersion system objective 1 is set to the condition, 0<WD≦0.03 mm, the corrected lens 3 is inserted in the optical path so that focusing is performed at a predetermined depth position in the same sample as in FIG. 3A, and at the same time, the imaging position at the image plane can be kept as in FIG. 3A.

In a state of FIG. 3A, a parallel beam of light is made to emerge from the oil immersion system objective 1 toward the imaging lens 2. When the whole of the oil immersion system objective 1 is moved close to the sample as it is so that the working distance WD between the cover glass CG covering the sample and the oil immersion system objective 1 meets the condition, 0<WD≦0.03 mm, the light beam from the oil immersion system objective 1 becomes a divergent beam and is made to emerge. The corrected lens 3 is thus introduced into the optical path so that the divergent beam from the oil immersion system objective 1 is converted into a parallel beam through the corrected lens units 3G1, 3G2, and 3G3, and the parallel beam is incident on the imaging lens 2.

In the corrected lens 3, the first corrected lens unit 3G1 and the second corrected lens unit 3G2 have the function of mainly adjusting the front focal distance of the whole of the oil immersion system objective 1 and the corrected lens 3 so as to become equal to the front focal distance of the whole of the oil immersion system objective 1 and the corrected lens 3 where the corrected lens 3 is not inserted in the optical path, while the third corrected lens unit 3G3 has the function of mainly keeping the imaging position at the image plane constant through the imaging lens 2.

Reference is made to the case where the microscope of the second embodiment constructed as mentioned above is used to carry out observations while suppressing the auto-fluorescence of the sample. Also, the microscope of the second embodiment, as shown in FIG. 3A, is constructed so that even when the working distance WD between the cover glass CG and the most sample-side lens surface in the oil immersion system objective 1 is 0.1 mm, the sample can be observed if a reduction of the amount of auto-fluorescence is not taken into account.

The corrected lens 3 is inserted between the oil immersion system objective 1 and the imaging lens 2, and the working distance WD between the cover glass CG and the most sample-side lens surface in the oil immersion system objective 1 is brought into a state of nearly zero (0<WD≦0.03 mm). In this case, the oil immersion system objective 1 is integrally moved while keeping the mutual positional relationship of the lens units G1, G2, G3, and G4 in a state of FIG. 3A. When such movement is conducted, the light beam from the oil immersion system objective 1 becomes a divergent beam and is made to emerge. However, when the corrected lens 3 is inserted in the optical path, the divergent beam from the objective 1 is converted into a parallel beam through the corrected lens units 3G1, 3G2, and 3G3, and the parallel beam is incident on the imaging lens 2. The front focal distance of the whole of the oil immersion system objective 1 and the corrected lens 3 is mainly adjusted through the first corrected lens unit 3G1 and the second corrected lens unit 3G2 of the corrected lens 3 so as to become equal to the front focal distance of the whole of the oil immersion system objective 1 and the corrected lens 3 where the corrected lens 3 is not inserted in the optical path, while the imaging position at the image plane by the imaging lens 2 is mainly kept constant through the third corrected lens unit 3G3.

As mentioned above, according to the microscope of the second embodiment, like the microscope of the first embodiment, the working distance WD between the cover glass CG and the most sample-side lens surface in the oil immersion system objective 1 is brought into a state of nearly zero (0<WD≦0.03 mm) through the corrected lens 3, and a predetermined depth position of the sample can be observed. Consequently, the thickness of the immersion oil becomes nearly zero and the auto-fluorescence from the immersion oil can be made to practically vanish. In this way, the working distance WD between the cover glass CG and the most sample-side lens surface in the oil immersion system objective 1 is brought into a state of nearly zero, and thereby the auto-fluorescence can be reduced by 30%.

According to the microscope of the second embodiment, the front focal position and the front focal distance of the whole of the oil immersion system objective 1 and the corrected lens 3 can be converted, through the corrected lens 3, into the front focal position and the front focal distance where the corrected lens 3 is not introduced into the optical path.

As in the microscope of the first embodiment, therefore, even when the thickness of the cover glass CG is changed, the working distance WD between the cover glass CG and the most sample-side lens surface in the oil immersion system objective 1 is brought into a state of nearly zero ($0<WD\leq 0.03$ mm) and the same depth position of the sample can be observed. Further, the working distance WD between the cover glass CG and the most sample-side lens surface in the oil immersion system objective 1 is brought into a state of nearly zero and a favorable image can be observed without undergoing the influence of the error of the thickness of the cover glass CG.

Moreover, with a state where the working distance WD between the cover glass CG and the most sample-side lens surface in the oil immersion system objective 1 is set to nearly zero ($0<WD\leq 0.03$ mm), a desired depth position of the sample can be observed.

Thus, according to the microscope of the first embodiment, when an observation object area is found, the working distance WD between the cover glass CG and the most sample-side lens surface in the oil immersion system objective 1 is increased (here, 0.1 mm) and observed, and in the fluorescence observation, the auto-fluorescence from the immersion oil is made to vanish and the fluorescent image of the high S/N ratio can be obtained. In addition, it can be prevented that the oil immersion system objective 1 collides against the sample to damage the sample, and a part of considerable depth in the sample can be focused. In this way, its operation property is much improved, as compared with the conventional microscope of this type. Moreover, the oil immersion system objective 1 having been used in the past can be used as it is.

Also, in the microscope of the second embodiment, to observe a desired depth position of the sample with a state where the working distance WD between the cover glass CG and the most sample-side lens surface in the oil immersion system objective 1 is set to nearly zero ($0<WD\leq 0.03$ mm), it is only necessary that, after the corrected lens 3 is inserted in the optical path, at least a partial lens placed on the image side of the most sample-side lens of lenses constituting the oil immersion system objective 1 is moved along the optical axis is moved along the optical axis in a predetermined direction by a predetermined amount, as in the case where the oil immersion system object 1 and the imaging lens 2 are included and where focusing is performed when the working distance WD between the cover glass CG and the most sample-side lens surface in the oil immersion system objective 1 is set to the condition, 0.03 mm<WD. Alternatively, the microscope may be constructed so that lenses (or lens units) constituting the oil immersion system objective 1 are not moved, but one of lenses (or lens units) constituting the corrected lens 3 is moved along the optical axis in a predetermined direction by adjusting the amount of movement.

Third Embodiment

Figure 4A:
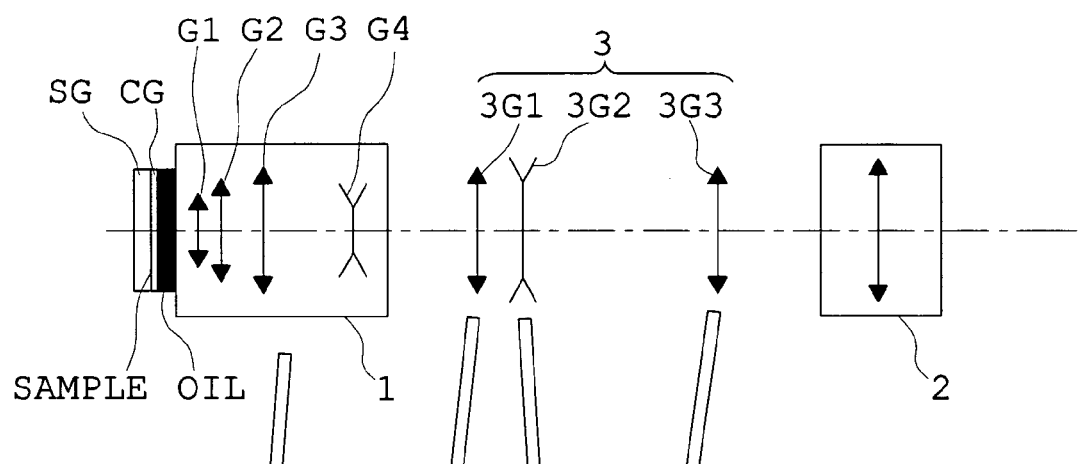
FIGS. 4A and 4B are schematic views showing optical arrangements in the microscope of a third embodiment according to the present invention in focusing states where the working distance WD between the cover glass covering the sample and the oil immersion system objective is set to 0.1 mm and the working distance WD between the cover glass covering the sample and the oil immersion system objective is set to the condition, $0<WD\leqq0.03$ mm, respectively.
Figure 4B:
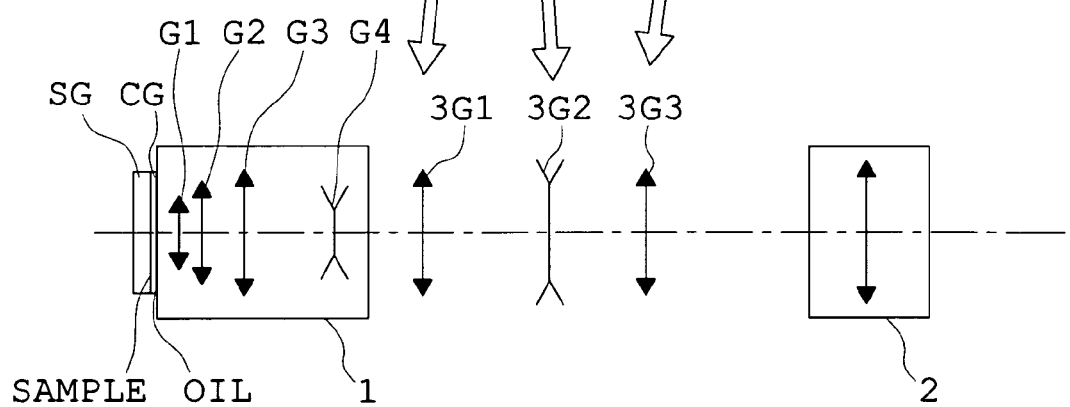

FIGS. 4A and 4B are schematic views showing optical arrangements in the microscope of a third embodiment according to the present invention in focusing states where the working distance WD between the cover glass covering the sample and the oil immersion system objective is set to 0.1 mm and the working distance WD between the cover glass covering the sample and the oil immersion system objective is set to the condition, $0<WD\leq 0.03$ mm, respectively. Also, in these figures, reference symbol CG denotes the cover glass and SG denotes the sample.

The microscope of the third embodiment comprises, in order form the sample side, the oil immersion system objective 1, the imaging lens 2, and the corrected lens 3 interposed between the oil immersion system objective 1 and the imaging lens 2. Also, the microscope of the third embodiment is constructed so that even when the working distance WD between the cover glass CG and the most sample-side lens surface in the oil immersion system objective 1 is 0.1 mm, the sample can be observed in a state where the oil immersion system objective 1 and the corrected lens 3 are arranged in the positional relationship shown in FIG. 4A, if the amount of auto-fluorescence is not taken into account.

The corrected lens 3 includes, in order form the oil immersion system objective 1 side, the first corrected lens unit 3G1 with positive refracting power, the second corrected lens unit 3G2 with negative refracting power, and the third corrected lens unit 3G3 with positive refracting power. The corrected lens 3 is constructed so that, by moving the entire oil immersion system objective 1 close to the sample without adjusting the positional relationship of lens units constituting the objective 1 in FIG. 4A, when the working distance WD between the cover glass covering the sample and the oil immersion system objective 1 is set to the condition, $0<WD\leq 0.03$ mm, focusing is performed at a predetermined depth position in the same sample as in FIG. 4A and the imaging position at the image plane can be kept as in FIG. 4A.

In a state of FIG. 4A, a parallel beam of light is made to emerge from the oil immersion system objective 1 toward the imaging lens 2. When the whole of the oil immersion system objective 1 is moved close to the sample as it is so that the working distance WD between the cover glass CG covering the sample and the oil immersion system objective 1 meets the condition, $0<WD\leq 0.03$ mm, a light beam from the oil immersion system objective 1 becomes a divergent beam and is made to emerge. The corrected lens 3 is thus constructed so that each of the corrected lens units 3G1, 3G2, and 3G3 is moved along the optical axis in a predetermined direction by a predetermined amount, and thereby the divergent beam from the objective 1 is converted into a parallel beam, which is incident on the imaging lens 2.

More specifically, the corrected lens 3 is such that when the front focal position of the oil immersion system objective 1 and the surface of the sample coincide with each other, the magnification of the whole is take as 1×, and when the working distance WD between the cover glass CG and the most sample-side lens surface in the oil immersion system objective 1 is changed from 0.03 mm<WD to $0<WD\leq 0.03$ mm, a spacing between the oil immersion system objective 1 and the first corrected lens unit 3G1 is narrowed, a spacing between the first corrected lens unit 3G1 and the second corrected lens unit 3G2 is widened, and a spacing between the second corrected lens unit 3G2 and the third corrected lens unit 3G3 is narrowed.

In the corrected lens 3, the first corrected lens unit 3G1 and the second corrected lens unit 3G2 have the function of mainly adjusting the front focal distance of the whole of the oil immersion system objective 1 and the corrected lens 3 so as to become equal to the front focal distance of the whole of the oil immersion system objective 1 and the corrected lens 3 where the corrected lens 3 is not inserted in the optical path, while the third corrected lens unit 3G3 has the function of mainly keeping the imaging position at the image plane constant through the imaging lens 2.

Reference is made to the case where the microscope of the third embodiment constructed as mentioned above is used to carry out observations while suppressing the auto-fluorescence of the sample. The working distance WD between the cover glass CG and the most sample-side lens surface in the oil immersion system objective 1 is brought into a state of nearly zero ($0 < WD \leqq 0.03$ mm). Also, in this case, the oil immersion system objective 1 is integrally moved while keeping the mutual positional relationship of the lens units G1, G2, G3, and G4 in a state of FIG. 4A. When such movement is conducted, the light beam from the oil immersion system objective 1 becomes a divergent beam and is made to emerge. However, the divergent beam from the objective 1 is converted into a parallel beam through the corrected lens units 3G1, 3G2, and 3G3 of the corrected lens 3, and the parallel beam is incident on the imaging lens. The front focal distance of the whole of the oil immersion system objective 1 and the corrected lens 3 is mainly adjusted through the first corrected lens unit 3G1 and the second corrected lens unit 3G2 of the corrected lens 3 so as to become equal to the front focal distance of the whole of the oil immersion system objective 1 and the corrected lens 3 where the corrected lens 3 is not inserted in the optical path, while the imaging position at the image plane by the imaging lens 2 is mainly kept constant through the third corrected lens unit 3G3.

As mentioned above, according to the microscope of the third embodiment, the working distance WD between the cover glass CG and the most sample-side lens surface in the oil immersion system objective 1 is brought into a state of nearly zero ($0 < WD \leqq 0.03$ mm) through the corrected lens 3 as in the microscope of each of the first and second embodiments, and thereby a predetermined depth position of the sample can be observed. Consequently, the thickness of the immersion oil becomes nearly zero and the auto-fluorescence from the immersion oil can be made to practically vanish. In this way, the working distance WD between the cover glass CG and the most sample-side lens surface in the oil immersion system objective 1 is brought into a state of nearly zero, and thereby the auto-fluorescence can be reduced by about 30%.

According the microscope of the third embodiment, as in the microscope of the second embodiment, the front focal distance and the front focal position of the whole of the oil immersion system objective 1 and the corrected lens 3 can be converted, through the corrected lens 3, into the front focal distance and the front focal position of the whole of the oil immersion system objective 1 and the corrected lens 3 where the corrected lens 3 is not inserted in the optical path. Thus, as in the microscope of each of the first and second embodiments, even when the thickness of the cover glass CG is changed, the working distance WD between the cover glass CG and the most sample-side lens surface in the oil immersion system objective 1 is brought into a state of nearly zero ($0 < WD \leqq 0.03$ mm), and the same depth position of the sample can be observed. Further, the working distance WD between the cover glass CG and the most sample-side lens surface in the oil immersion system objective 1 is brought into a state of nearly zero and a favorable image can be observed without undergoing the influence of the error of the thickness of the cover glass CG. Moreover, with a state where the working distance WD between the cover glass CG and the most sample-side lens surface in the oil immersion system objective 1 is set to nearly zero ($0 < WD \leqq 0.03$ mm), a desired depth position of the sample can be observed.

Thus, according to the microscope of the third embodiment, when an observation object area is found, the working distance WD between the cover glass CG and the most sample-side lens surface in the oil immersion system objective 1 is increased (here, 0.1 mm) and observed, and in the fluorescence observation, auto-fluorescence from the immersion oil is made to vanish and the fluorescent image of the high S/N ratio can be obtained. In addition, it can be prevented that the oil immersion system objective 1 collides against the sample to damage the sample, and a part of considerable depth in the sample can be focused. In this way, its operation property is much improved, as compared with the conventional microscope of this type. Moreover, the oil immersion system objective 1 having been used in the past can be used as it is.

Also, in the microscope of the third embodiment, to observe a desired depth position of the sample with a state where the working distance WD between the cover glass CG and the most sample-side lens surface in the oil immersion system objective 1 is set to nearly zero ($0 < WD \leqq 0.03$ mm), it is only necessary that at least a partial lens placed on the image side of the most sample-side lens of lenses constituting the oil immersion system objective is moved along the optical axis in a predetermined direction by a predetermined amount, as in the case where the oil immersion system object 1 and the imaging lens 2 are included and where focusing is performed when the working distance WD between the cover glass CG and the most sample-side lens surface in the oil immersion system objective 1 is set to the condition, 0.03 mm<WD. Alternatively, the microscope may be constructed so that lenses constituting the oil immersion system objective 1 are not moved, but one of lenses constituting the corrected lens 3 is moved along the optical axis in a predetermined direction by adjusting the amount of movement.

The microscope using the oil immersion system objective and its microscopy are useful for the field in which it is required to use the oil immersion system objective in order to observe fluorescent light emanating from the sample of the living cell for the purposes of the functional clarification of living cells and the behavior analysis and interaction clarification of a protein.

What is claimed is:
1. A microscope comprising:
an oil immersion system objective used under a condition where oil is charged between a cover glass and a most sample-side lens surface of the oil immersion system objective; and
an imaging lens,
wherein a front focal length and a front focal position of the oil immersion system objective are made adjustable so that a predetermined depth position in a sample is focused on in a state where a working distance WD between the cover glass and the most sample-side lens surface is set to satisfy a condition, $0<WD<0.03$ mm,
wherein the oil immersion system objective comprises, in order from a sample side:

a first lens unit, a most image-side surface of which is convex, having positive refracting power as a whole;

a second lens unit, a most image-side surface of which is convex, having positive refracting power as a whole;

a third lens unit constructed with a cemented lens, having positive refracting power as a whole; and a fourth lens unit constructed with a cemented lens, having negative refracting power as a whole, and wherein when the working distance WD is changed from 0.03 mm <WD to 0<WD≦0.03 mm, a spacing between the first lens unit and the second lens unit is widened, a spacing between the second lens unit and the third lens unit is narrowed, and a spacing between the third lens unit and the fourth lens unit is narrowed, to thereby adjust the front focal length and the front focal position so that the predetermined depth position in the sample is focused on.

2. An observation method of a microscope using an oil immersion system objective, comprising the steps of:

providing an oil immersion system objective that comprises, in order from a sample side:

a first lens unit, a most image-side surface of which is convex, having positive refracting power as a whole;

a second lens unit, a most image-side surface of which is convex, having positive refracting power as a whole;

a third lens unit constructed with a cemented lens, having positive refracting power as a whole; and a fourth lens unit constructed with a cemented lens, having negative refracting power as a whole;

providing an imaging lens;

preparing a sample with a cover glass protecting the sample;

charging oil immersion between the cover glass protecting the sample and a most sample-side lens surface of the oil immersion system objective;

adjusting a working distance WD between the cover glass and the most sample-side lens surface of the oil immersion system objective from 0.03 mm<WD to 0<WD≦0.03 mm; and adjusting a front focal length and a front focal position of the oil immersion system objective by widening a spacing between the first lens unit and the second lens unit, narrowing a spacing between the second lens unit and the third lens unit, and narrowing a spacing between the third lens unit and the fourth lens unit, so that a predetermined depth position in the sample is focused on when the working distance WD is changed from 0.03 mm<WD to 0<WD<0.03 mm.

\* \* \* \* \*

UNITED STATES PATENT AND TRADEMARK OFFICE
CERTIFICATE OF CORRECTION

PATENT NO. : 7,602,556 B2  Page 1 of 1
APPLICATION NO. : 11/454909
DATED : October 13, 2009
INVENTOR(S) : Kenji Kawasaki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 288 days.

Signed and Sealed this

Fifth Day of October, 2010

David J. Kappos
*Director of the United States Patent and Trademark Office*